United States Patent
Doleh et al.

(10) Patent No.: US 10,565,106 B2
(45) Date of Patent: Feb. 18, 2020

(54) GARBAGE COLLECTION OF NUISANCE COOKIES

(71) Applicant: International Business Machines Corporation, Armonk, NY (US)

(72) Inventors: Yaser K. Doleh, North Royalton, OH (US); Brian W. Jensen, Raleigh, NC (US); Patrick Rodrigo Mardones Rodriguez, Recoleta (CL); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/825,631

(22) Filed: Nov. 29, 2017

(65) Prior Publication Data
US 2019/0163624 A1 May 30, 2019

(51) Int. Cl.
*G06F 12/02* (2006.01)
*H04L 29/08* (2006.01)
*G06F 17/30* (2006.01)
*G06F 16/958* (2019.01)

(52) U.S. Cl.
CPC ........ *G06F 12/0253* (2013.01); *G06F 16/972* (2019.01); *H04L 67/02* (2013.01)

(58) Field of Classification Search
CPC .. G06F 12/0253; G06F 16/972; G06F 16/957; H04L 67/02
USPC ........................................................ 707/813
See application file for complete search history.

(56) References Cited

U.S. PATENT DOCUMENTS

| | | | |
|---|---|---|---|
| 6,910,180 B1 | 6/2005 | Cui et al. | |
| 7,024,451 B2* | 4/2006 | Jorgenson | H04L 29/06 709/203 |
| 7,379,980 B1 | 5/2008 | Gilbert | |
| 7,761,581 B2 | 7/2010 | Pagan | |
| 8,090,877 B2 | 1/2012 | Agarwal et al. | |
| 8,220,037 B2 | 7/2012 | Snyder et al. | |
| 2014/0380145 A1* | 12/2014 | Wilsher | H04L 12/287 715/234 |
| 2015/0348104 A1 | 12/2015 | Casteel et al. | |
| 2016/0173615 A1 | 6/2016 | Pattan | |
| 2017/0169100 A1* | 6/2017 | Reshadi | G06F 21/64 |

OTHER PUBLICATIONS

Data guide, DMA UK Ltd 2014 (Year: 2014).*
Qt Company Ltd, "QWebEngineCookieStore Class," <<http://doc.qt.io/>>, printed Oct. 1, 2019, 14 pgs.

* cited by examiner

*Primary Examiner* — Kuen S Lu
(74) *Attorney, Agent, or Firm* — Robert J. Shatto (57) ABSTRACT

The disclosure is directed to garbage cleaning of cookies in a web browser. A computer-implemented process according to embodiments includes: determining a presence of a first cookie and a second cookie in the web browser, the first cookie and the second cookie representing a cleanliness status of the web browser; in response to determining that the first cookie and the second cookie are both present in the web browser, indicating a status of the web browser as clean and taking no further cleaning action; and in response to determining that only the first cookie is present in the web browser, indicating the status of the web browser as needs cleaning, and performing garbage collection of cookies in the web browser.

18 Claims, 4 Drawing Sheets

GARBAGE COLLECTION OF NUISANCE COOKIES

TECHNICAL FIELD

The present invention relates generally to web browsers, and more particularly, to a method, system, and computer program product for the garbage collection of nuisance cookies in a web browser.

BACKGROUND

Many independent application operators within a single domain, e.g. "example.com," are able to choose session cookie settings, making decisions independently for what is best for their application. In the aggregate these decisions sometimes have detrimental effects. For instance, application operators would prefer to have cookies that are persistent and have very wide scopes to ensure the most coverage. In large organization these cookies may accumulate over time leading to an overflow of input buffers on web servers.

SUMMARY

A first aspect of the invention provides a computer-implemented process for garbage cleaning of cookies in a web browser, including: determining a presence of a first cookie and a second cookie in a web browser, the first cookie and the second cookie representing a cleanliness status of the web browser; in response to determining that the first cookie and the second cookie are both present in the web browser, indicating a status of the web browser as clean and taking no further cleaning action; and in response to determining that only the first cookie is present in the web browser, indicating the status of the web browser as needs cleaning, and performing garbage collection of cookies in the web browser.

A second aspect of the invention provides a computerized system for performing a method for garbage cleaning of cookies in a web browser, the method including: determining a presence of a first cookie and a second cookie in the web browser, the first cookie and the second cookie representing a cleanliness status of the web browser; in response to determining that the first cookie and the second cookie are both present in the web browser, indicating a status of the web browser as clean and taking no further cleaning action; and in response to determining that only the first cookie is present in the web browser, indicating the status of the web browser as needs cleaning, and performing garbage collection of cookies in the web browser.

A third aspect of the invention provides a computer program product stored on a computer readable storage medium, which when executed by a computer system, performs a method for garbage cleaning of cookies in a web browser, the method including: determining a presence of a first cookie and a second cookie in a web browser, the first cookie and the second cookie representing a cleanliness status of the web browser; in response to determining that the first cookie and the second cookie are both present in the web browser, indicating a status of the web browser as clean and taking no further cleaning action; and in response to determining that only the first cookie is present in the web browser, indicating the status of the web browser as needs cleaning, and performing garbage collection of cookies in the web browser.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description taken in conjunction with the accompanying drawings that depict various aspects of the invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

The present invention relates generally to web browsers, and more particularly, to a method, system, and computer program product for the garbage collection of nuisance cookies in a web browser.

According to embodiments, garbage collection of cookies is performed in a web browser within a managed domain space using a defined overarching policy. A scheduling mechanism in the web browser is provided for deferred and periodic execution of actions such as proactive cleaning of non-essential or otherwise nuisance cookies. In general, there is provided a signal management module, which executes in either a client/browser or server context, for maintaining the proper status of signal cookies, and a cleaning module, which executes in a client in either a client/browser or server context, for performing garbage collection functions. The cleaning module, when executed on the client/browser context, may execute inline actions or downloaded actions.

Figure 1:
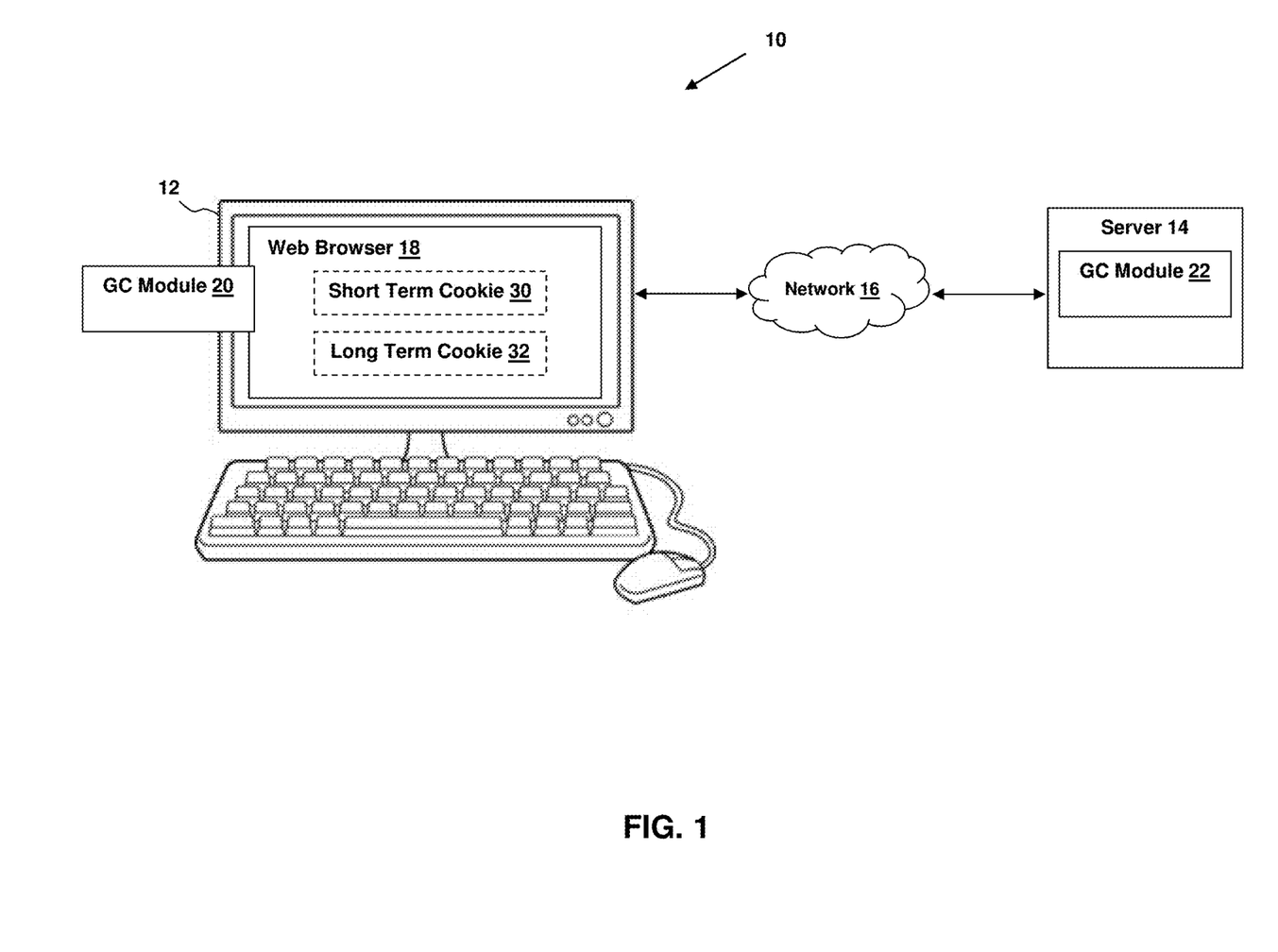
FIG. 1 depicts a client/server system providing garbage collection of nuisance cookies according to embodiments.

FIG. 1 depicts a client/server system 10 providing garbage collection of nuisance cookies according to embodiments. The client/server system 10 includes at least one client device (client 12) connected to a server 14 (e.g., web server) through a network 16.

The client 12 can be any type of device, such as a computer, mobile phone, etc., capable of supporting a web browser 18. The server 14 stores, processes, and delivers web pages to the client 12. The network 16 can be a wired and/or wireless network, such as a local area network (LAN) or a wide area network (WAN), including an extranet, the Internet, and/or the like. The client/server system 10 may include at least one of a client-side garbage collection module 20 on the client 12 and a server-side garbage collection module 22 on the server 14. The functionality of the client-side garbage collection module 20 and the server-side garbage collection module 22 will be described in greater detail below.

According to embodiments, two different cookies (i.e., a short term cookie 30 and a long term cookie 32) are set on the web browser 18, representing Boolean values with opposing meanings, and different time periods, to indicate the cleanliness status of the web browser 18. The short and long term cookies 30, 32 expire (i.e., are no longer set) at the expiration of their respective time periods.

The web browser 18 is considered "clean" and a participant in the garbage collection scheme as long as both the short term cookie 30 and the long term cookie 32 remain set, and no further action (e.g., no garbage collection) is required. When set, the long term cookie 32 indicates a "needs cleaning" status. When set, the short term cookie 30 indicates a "clean" status. The expiration (and resulting absence) of the short term cookie 30 causes a prescribed action (garbage collection) to commence. The end of the prescribed action causes the setting of a new short term cookie 30 and resetting of the time period of the long term cookie 32 for continued participation in the garage collection scheme. With this arrangement, the absence of the long term cookie 32 indicates a non-participation in the garbage collection scheme, which triggers the setting of both of the short term cookie 30 and the long term cookie 32 as an initial status.

Figure 2:
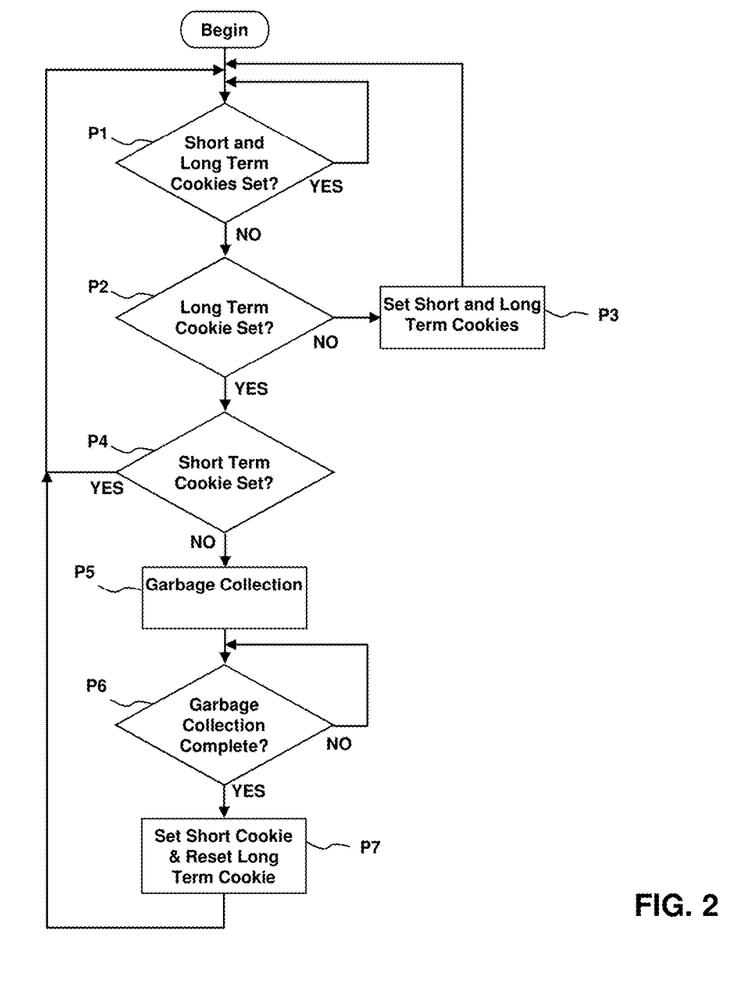
FIG. 2 depicts a process for providing garbage collection of nuisance cookies according to embodiments.

A flow diagram of the evaluation process of the short term cookie 30 and the long term cookie 32 according to embodiments is depicted in FIG. 2. It is assumed for sake of description that the short term cookie 30 and the long term cookie 32 are initially set.

At P1, the short and long term cookies 30, 32 are evaluated (e.g., periodically or continually) to determine their status. If both of the short and long term cookies 30, 32 are valid (e.g., not expired) (YES, P1), the evaluation of the short and long term cookies 30, 32 at P1 is repeated. Otherwise (NO, P1), flow passes to P2.

If the long term cookie 32 is not set (NO, P2), the short term cookie 30 and the long term cookie 32 are set to an initial status at P3. Flow then passes back to P1. If the long term cookie 32 is set (YES, P2), the short term cookie 30 is evaluated at P4.

If the short term cookie 30 is set (YES, P4), no further action (e.g., no garbage collection) is required, and flow passes back to P1. Otherwise (NO, P4), garbage collection is performed at P5 to remove a set of cookies (e.g., nuisance cookies). Upon completion of the garbage collection (YES, P6), a new short term cookie 30 is set and the time period of the long term cookie 32 is reset at P7. Flow then passes back to P1.

According to embodiments, a short term cookie 30 and a long term cookie 32 are set on the web browser 18 to indicate the cleanliness status of the web browser 18. The short and long term cookies 30, 32 expire (i.e., are no longer set) at the expiration of their respective time periods. In an illustrative implementation, the short term cookie 30 is set at a first duration (e.g., 24 hours) as a Boolean value (e.g., I_AM_CLEAN=1 domain=*.ibm.com patpath=/ expire=tomorrow). The long term cookie 32 is set to a second, longer duration (e.g., 365 days) as a Boolean value that acts as a pointer to the code to be executed (e.g., I_NEED_CLEANING="http://www.example.com/ cleanme" domain=*.ibm.com path=/expire="next year"). Any suitable time durations may be used, so long as the long term cookie 32 is set to a longer time duration than the short term cookie 32.

An action table for the Boolean values of the short and long term cookies 30, 32 is presented in the TABLE A, where:

short term cookie 30→I_AM_CLEAN; and long term cookie 32→I_NEED_CLEANING.

TABLE A

|  | I_AM_CLEAN (Present) | I_AM_CLEAN (Absent) |
|---|---|---|
| I_NEED_CLEANING (Present) | No Operation | Perform Cleaning |
| I_NEED_CLEANING (Absent) | setCookie I_NEED_CLEANING | setCookie I_NEED_CLEANING I_AM_CLEAN |

Figure 3:
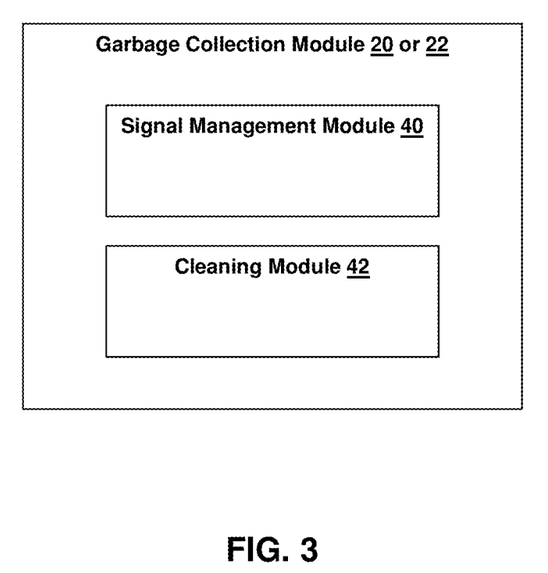
FIG. 3 depicts the garbage collection module of FIG. 1 in greater detail according to embodiments.

Referring now to FIG. 3, the garbage collection module 20 on the client 12 and the server-side garbage collection module 22 on the server 14 may each include a signal management module 40 and a cleaning module 42. The purpose of the modules 40, 42 is described below.

Signal Management Module

The signal management module 40 may be activated in the web browser 18 by referencing a specific program/script (e.g., via a theme of a website). For example, a beacon present in the masthead or footer when a web page is loaded may be used to activate the signal management module 40, which may be executed in either a client/browser execution context or a server execution context.

In the case of a server execution context (see, e.g., pseudo-code exemplar below), the evaluation of the short and long term cookies 30, 32 and resulting "Set-Cookie" or "Location" HTTP headers is performed as part of the server-side beacon processing logic. The results of signal processing include:

a) redirection to load a transparent image/object;

b) the generation of a Set-Cookie header for a long term cookie 32 along with the redirection of the transparent image/object;

c) the redirection to a server-side program/script that performs the cleaning actions; or d) the generation of Set-Cookie headers for both a long term cookie 32 and a short term cookie 30 along with the redirection of the transparent image/object. This method may be performed whenever inspection of the processing would be undesirable.

Exemplar for Server Execution Context with Inline Cleaning Module

```
cookies=parseCookies(request);
if cookie(I_AM_CLEAN) EXISTSIN cookies ; {
    if cookie(I_NEED_CLEANING) EXISTSIN cookies {
        : # no op
```

```
        }
        else {
                response=response + makeResponseHeader(setCookie(I_NEED_CLEANING,
*.example.com, /, 365 days));
        }
    else {
        if cookie(I_NEED_CLEANING) EXISTSIN cookies; {
                foreach thisCookie in cookies; {
                        response=response + makeResponseHeader(setCookie(thisCookie,
                        *.example.org, / , yesterday);
                }
                response=response + setCookie(I_AM_CLEAN, *.example.com, /, tomorrow)
                response=response + setCookie(I_NEED_CLEANING, *.example.com, /, 365
                days)
        }
        else { # Neither exists
                response=response + setCookie(I_AM_CLEAN, *.example.com, /, tomorrow)
                response=response + setCookie(I_NEED_CLEANING, *.example.com, /, 365
                days)
        }
    }
    response=response + makeResponse(redirect(http://www.example.org/image.gif));
    sendResponse(response);
```

In the case of browser/client execution context (see, e.g., pseudo-code exemplars below), the evaluation of the short and long term cookies 30, 32 and triggering of the resulting action is performed on the web browser 18 via a downloaded program/script (e.g., downloaded from the server 14). The resulting action may execute in either a client/browser or server context. The results of signal processing may include:

a) no action;

b) the local setting of a long term cookie 32;

c) the execution of local code that performs the cleaning actions along with the setting of both long and short term cookies 30, 32; or d) the generation of both long and short term cookies 30, 32. This method may be performed whenever performance is at a premium.

Exemplar of Browser/Client Execution Context with Server Actions (pseudo code to be run in web browser each time a web page is loaded)

```
cleaning_module_URL="https://www.example.org/cookie_cleaner.jsp"
if cookie(I_AM_CLEAN); {
        if cookie(I_NEED_CLEANING) {
                : #no op
        }
        else {
                setCookie(I_NEED_CLEANING, *.example.com, /,
                365 days)
        }
else {
        if cookie(I_NEED_CLEANING); {
                getURL(cleaning_module_URL)
                setCookie(I_AM_CLEAN, *.example.com, /,
                tomorrow)
                setCookie(I_NEED_CLEANING, *.example.com, /,
                365 days)
        }
        else { # Neither cookie exists
                setCookie(I_AM_CLEAN, *.example.com, /,
                tomorrow)
                setCookie(I_NEED_CLEANING, *.example.com, /,
                365 days)
        }
}
```

Exemplar of Browser/Client Execution Context with Cleaning Actions Consulting a Data Store (pseudo code to be run in web browser each time a web page is loaded)

```
good_cookies="http://www.example.org/good_cookies.json"
bad_cookies="http://www.example.org/bad_cookies.json"
If EXISTS cookie(I_AM_CLEAN); {
        if cookie(I_NEED_CLEANING) {
                : #no op
        }
        else {
                setCookie(I_NEED_CLEANING, *.ibm.com, /,
                365 days)
        }
else {
        if cookie(I_NEED_CLEANING); {
                vital_cookies=getJSON(good_cookies)
                problem_cookies=getJSON(bad_cookies)
                foreach cookie in getLocalCookies; {
                        if cookie NOTEXISTSIN vital_cookies ;
                        { expire(cookie) }
                        if cookie EXISTSIN problem_cookies ;
                        { expire(cookie) }
                }
                setCookie(I_AM_CLEAN, *.ibm.com, /, tomorrow)
                setCookie(I_NEED_CLEANING, *.ibm.com, /,
                365 days)
        }
        else { # Neither cookie exists
                setCookie(I_AM_CLEAN, *.ibm.com, /, tomorrow)
                setCookie(I_NEED_CLEANING, *.ibm.com, /,
                365 days)
        }
}
```

Cleaning Module

The cleaning module 42 is activated by the signal management module 40. The cleaning module 42 can execute in either the client/browser context or the server context. The cleaning module 42 performs the required garbage collection actions to achieve the desired (clean) status, and sets a short term cookie 30 indicating the clean status as its last action. The cleaning module 42 may clear all the cookies that are present, or consult a data store to only clean those cookies that are present in the data store (e.g., bad cookies). Conversely, the consultation may be such as to clean all cookies except those that are present in the data store (good cookies).

Cleaning JavaScript Code Run Secondary to User Action

```
// mini-jQuery – CRUD COOKIES
var $ = function (id) { return document.getElementById(id); };
```

-continued

```
// Cache
$set = $('set');
$read = $('read');
$delete = $('delete');
$logs = $('logs');
// Logs in textarea
var log = function (log) {
$logs.value = log + '\n' + $logs.value;
}
// Create Cookie
var createCookie = function (key, value) {
        expires = new Date( );
        expires.setTime(expires.getTime( ) + 31536000000);
        cookie = key + "=" + value + ";expires=" +
        expires.toUTCString( );
        log("createCookie: " + cookie);
        return document.cookie = cookie;
}
// Read Cookie
var readCookie = function (key) {
        keyValue = document.cookie.match("(^|;) ?" + key +
        "=([^;]*)(;|$)");
        if (keyValue) {
                log("readCookie: " + key + "=" + keyValue[2]);
                return keyValue[2];
        } else {
                log("getCookie: " + key + "=" + "null");
                return null;
        }
}
// Destroy Cookie
var destroyCookie = function (key) {
        log("destroyCookie: " + key);
        return document.cookie = key + '=;expires=Thu, 01 Jan 1970
        00:00:01 GMT;';
}
// Buttons for Demo
$set.onclick = function ( ) {
        key = $('key').value;
        value = $('value').value;
        createCookie(key, value);
}
$read.onclick = function ( ) {
        key = $('key-read').value;
        readCookie(key);
}
$delete.onclick = function ( ) {
        key = $('key-delete').value;
        destroyCookie(key);
}
// Search clenan for hostname
(function ( ) {
        var cookies = document.cookie.split("; ");
        for (var c = 0; c < cookies.length; c++) {
                var d = window.location.hostname.split(".");
                while (d.length > 0) {
                        var cookieBase = encodeURIComponent(cookies[c].
                        split(";")[0].split("=")[0]) + '=; expires=Thu,
                        01-Jan-1970 00:00:01 GMT; domain=' +
                        d.join('.') + ' ;path=';
                        var p = location.pathname.split('/');
                        document.cookie = cookieBase + '/';
                        while (p.length > 0) {
                                document.cookie = cookieBase + p.join('/');
                                p.pop( );
                        };
                        d.shift( );
                }
        }
})( );
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the program product of the present invention may be manually loaded directly in a computer system via a storage medium such as a CD, DVD, etc., the program product may also be automatically or semi-automatically deployed into a computer system by sending the program product to a central server or a group of central servers. The program product may then be downloaded into client computers that will execute the program product. Alternatively the program product may be sent directly to a client system via e-mail. The program product may then either be detached to a directory or loaded into a directory by a button on the e-mail that executes a program that detaches the program product into a directory. Another alternative is to send the program product directly to a directory on a client computer hard drive.

Figure 4:
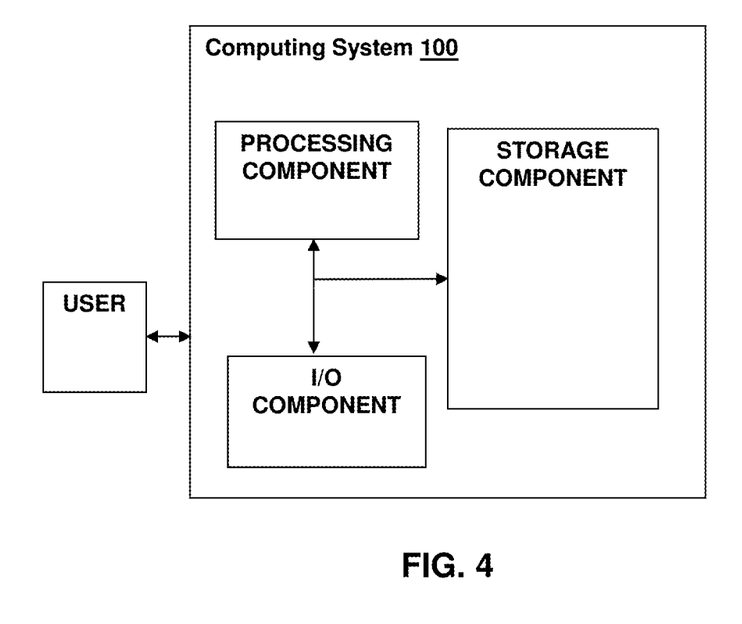
FIG. 4 depicts a processing system for providing garbage collection of nuisance cookies according to embodiments.

FIG. 4 depicts an illustrative processing system 100 (e.g., within a mobile device) for implementing various aspects of the present invention, according to embodiments. The processing system 100 may comprise any type of computing device and, and for example includes at least one processor, memory, an input/output (I/O) (e.g., one or more I/O interfaces and/or devices), and a communications pathway. In general, processor(s) execute program code, which is at least partially fixed in memory. While executing program code, processor(s) can process data, which can result in reading and/or writing transformed data from/to memory and/or I/O for further processing. The pathway provides a communications link between each of the components in processing system 100. I/O can comprise one or more human I/O devices, which enable a user to interact with processing system 100.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A computer-implemented process for garbage collection of cookies in a web browser, comprising:
    determining a presence of a first cookie and a second cookie in the web browser, the first cookie and the second cookie representing a cleanliness status of the web browser;
    in response to determining that the first cookie and the second cookie are both present in the web browser, indicating a status of the web browser as clean and taking no further cleaning action; and
    in response to determining that only the first cookie is present in the web browser, indicating the status of the web browser as needs cleaning, and performing garbage collection of cookies in the web browser.

2. The computer-implemented process according to claim 1, wherein the first cookie is a long term cookie having a validity period, and wherein the second cookie is a short term cookie having a validity period shorter than the validity period of the long term cookie.

3. The computer-implemented process according to claim 2, further comprising, prior to the determining:
    setting the validity period of the short term cookie;
    setting the short term cookie to a first Boolean value;
    setting the validity period of the long term cookie; and
    setting the long term cookie to a second Boolean value, different than the first Boolean value.

4. The computer-implemented process according to claim 3, wherein the second Boolean value comprises a pointer to a computer program product, which when executed, performs the garbage collection of cookies in the web browser.

5. The computer-implemented process according to claim 2, further comprising:
    in response to determining that the long term cookie is not present, setting the short term and long term cookies.

6. The computer-implemented process according to claim 2, further comprising:
    in response to completion of the garbage collection of cookies in the web browser, setting the short term and long term cookies.

7. A computerized system for garbage collection of cookies in a web browser by performing a method, the method comprising:
- determining a presence of a first cookie and a second cookie in the web browser, the first cookie and the second cookie representing a cleanliness status of the web browser;
- in response to determining that the first cookie and the second cookie are both present in the web browser, indicating a status of the web browser as clean and taking no further cleaning action; and
- in response to determining that only the first cookie is present in the web browser, indicating the status of the web browser as needs cleaning, and performing garbage collection of cookies in the web browser.

8. The computerized system according to claim 7, wherein the first cookie is a long term cookie having a validity period, and wherein the second cookie is a short term cookie having a validity period shorter than the validity period of the long term cookie.

9. The computerized system according to claim 8, the method further comprising, prior to the determining:
- setting the validity period of the short term cookie;
- setting the short term cookie to a first Boolean value;
- setting the validity period of the long term cookie; and
- setting the long term cookie to a second Boolean value, different than the first Boolean value.

10. The computerized system according to claim 9, wherein the second Boolean value comprises a pointer to a computer program product, which when executed, performs the garbage collection of cookies in the web browser.

11. The computerized system according to claim 8, the method further comprising:
- in response to determining that the long term cookie is not present, setting the short term and long term cookies.

12. The computerized system according to claim 8, the method further comprising:
- in response to completion of the garbage collection of cookies in the web browser, setting the short term and long term cookies.

13. A computer program product comprising a computer readable storage medium having program instructions embodied therewith, the program instructions executable by a computer system to cause the computer system to perform a method for garbage cleaning of cookies in a web browser, the method including:
- determining a presence of a first cookie and a second cookie in the web browser, the first cookie and the second cookie representing a cleanliness status of the web browser;
- in response to determining that the first cookie and the second cookie are both present in the web browser, indicating a status of the web browser as clean and taking no further cleaning action; and
- in response to determining that only the first cookie is present in the web browser, indicating the status of the web browser as needs cleaning, and performing garbage collection of cookies in the web browser.

14. The computer program product according to claim 13, wherein the first cookie is a long term cookie having a validity period, and wherein the second cookie is a short term cookie having a validity period shorter than the validity period of the long term cookie.

15. The computer program product according to claim 14, further comprising, prior to the determining:
- setting the validity period of the short term cookie;
- setting the short term cookie to a first Boolean value;
- setting the validity period of the long term cookie; and
- setting the long term cookie to a second Boolean value, different than the first Boolean value.

16. The computer program product according to claim 15, wherein the second Boolean value comprises a pointer to a computer program product, which when executed, performs the garbage collection of cookies in the web browser.

17. The computer program product according to claim 14, further comprising:
- in response to determining that the long term cookie is not present, setting the short term and long term cookies.

18. The computer program product according to claim 14, further comprising:
- in response to completion of the garbage collection of cookies in the web browser, setting the short term and long term cookies.

* * * * *